Figures 1, 2:
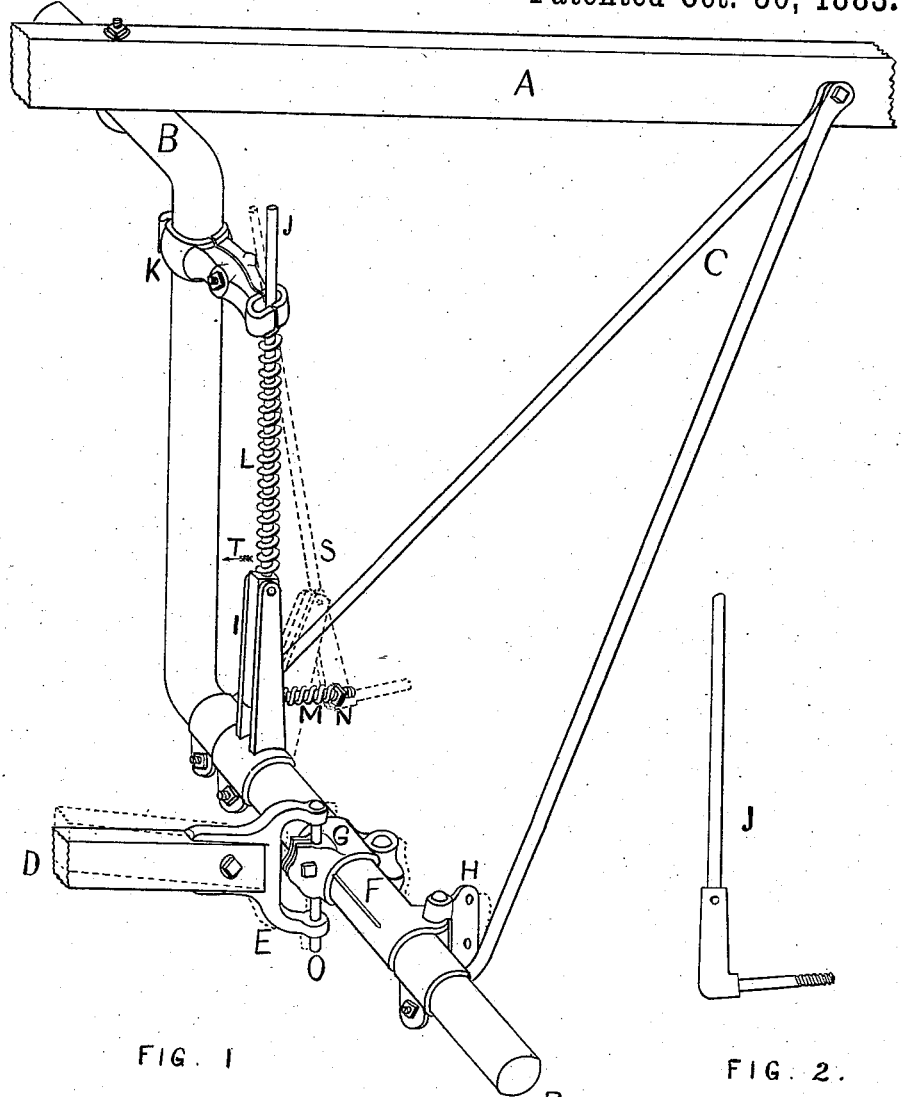

(Model.)

J. B. NEFF.
CULTIVATOR SPRING.

No. 287,703. Patented Oct. 30, 1883.

WITNESSES:-
Perley Hale.
S. S. Tuttle

INVENTOR:-
Joseph B Neff

UNITED STATES PATENT OFFICE.

JOSEPH B. NEFF, OF BURLINGTON, IOWA, ASSIGNOR TO THE BURLINGTON PLOW COMPANY, OF SAME PLACE.

CULTIVATOR-SPRING.

SPECIFICATION forming part of Letters Patent No. 287,703, dated October 30, 1883.

Application filed June 26, 1883. (Model.)

*To all whom it may concern:*

Be it known that I, JOSEPH B. NEFF, of the city of Burlington, in the county of Des Moines and State of Iowa, have invented a new and useful Improvement in Cultivator-Springs and their Attachments, by which they are made of greater utility than heretofore, of which the following is a specification.

The invention relates to springs on cultivators, by means of which the gangs are carried in suspension at the working-point, and yet not restrained from free parallel motion, and by which also the gangs are elevated with light effort, and which will allow the plow to be depressed by the operator to accommodate the inequalities of the ground, and yet will instantly bring back the gang to the carrying-point when the hand-pressure is removed.

The object of my invention is to provide a cultivator-spring so attached and controlled that it will not only effectually aid the operator to elevate the gang, but that will also prevent the passing of a dead-center by a counter-spring sustaining the gang when the lifting-spring arrives at the dead-center, the carrying-spring being independent of the lifting-spring, and providing a lifting-spring with accessory aids or peculiar adjustments that give it greater effectiveness, and providing a counter or carrying spring with adjustable tension to check the gang at a higher or lower point and affect the depth of plowing, and providing a double spring that suspends the gang at any desired working-point and maintains an even depth of plowing.

In the accompanying drawings, which form a part of this specification, and in which similar letters of reference indicate like parts, Figure 1 is a perspective view of a device embodying my invention. Fig. 2 is a drawing of my spring-rod to show the manner of its construction.

A is a section of a cultivator-tongue; B, section of axle; C, braces, which are parts of a cultivator-frame. Upon the arm of the axle B rests the coupling-sleeve F, to the outer end of which is attached the hitch-clevis H, and upon the other end the sleeve projection I, which is constructed preferably bifurcated at one end, and with forks parallel to each other, transversely transpierced with a hole through each of their terminal points. The other end of the sleeve projection I may be cast solidly to the sleeve F or clamped on, as shown in Fig. 1. The parallel forks of the sleeve projection I admit the L-shaped spring-bar J, which is pivoted between the forks. L is the long spring. M is the short spring. N is the adjusting-nut on the short foot of the spring-bar J. K is the clamp-stop, clamped upon the axle in the usual way, with a hole in the projecting part, through which the spring-bar J operates. D is a section of a cultivator-beam; E, the beam-jaw; G, the coupling-clamp; one end of which is clamped around the sleeve F, and the other end clamped around the coupling-pin O. The spring-bar J is constructed in one piece, and preferably round where the springs rest upon it, and preferably flat where it rests between and is pivoted to the sleeve projection I. The spring-bar J is constructed with a long leg and a short foot, the foot standing at an angle from the leg and carried below the pivotal point, for the purpose of obtaining greater movement and less strain upon the spring. The foot of the spring-bar J carries the short spring M, and is provided with an adjusting device, preferably a nut and thread. The leg of the spring-bar J carries the long spring.

The operation of the device is as follows: When the clamp-stop K is placed at the proper point on the axle B and the springs and their connections put together, as shown in Fig. 1, the long spring being compressed and held under tension by the clamp-stop K, it will readily be seen that any movement of the beam D vertically changes the position of the sleeve projection J with reference to the clamp-stop K and gives a leverage for the long spring to act upon, and the higher the beam is raised, up to a certain point, the greater the leverage and the greater effect of the long spring to aid the operator to raise the gang. When the beam D is depressed until the long spring L stands perpendicularly, the action of the long spring upon the beam ceases. The clamp-stop K can be moved up or down to give greater or less tension to the long spring L. The clamp-stop K can also be moved laterally, and hence change the point of elevation at which the action of the long spring ceases upon the beam D. When the operator attempts to force the plow into the ground past the dead-center of the long spring, a resistance is met in the short spring M. The short spring M is placed upon the short foot of the spring-bar J. Its back end rests against the edges of the forks of the sleeve projection I at a considerable distance from the top. The other end of the short spring M is held by the adjusting-nut N to give greater or less limit to the said short spring N. A pin and washer may be used in place of the nut. When the beam is lowered until the short spring is being compressed, the gang is suspended in its downward movement, and yet held in such a manner that a slight effort of the operator will still further compress the short spring M and enable the plow to go deeper or to plow in dead furrows and low places. When the hand-pressure is released, the short spring M will bring the beam D back to the carrying-point. The short spring M also prevents the long spring L from passing the dead-center and objectionably pressing the plows into the ground, as is always the case with cultivator-springs of this character that have not adjunctly the short stop or carrying-spring.

By the use of my invention the gangs are easily raised or hung up, and the gangs are carried in an easy vibratory manner, and no objectionable reverse spring action is encountered in its use.

I do not claim a cultivator-spring, broadly, either in one or two parts, as cultivator-springs have long been in use.

What I claim is—

1. In a cultivator-coupling, the spring-bar J, made L shape, with a long and short arm, and pivoted in the long arm above the angle, and adapted to receive springs upon both arms, substantially as shown and described.

2. The angular spring-bar J, pivoted above and distant from the angle, in combination with the springs L M, clamp-socket K, and sleeve F, having rigid arms I, substantially as shown and described.

3. The combination of the angular spring-bar J, pivoted above the angle in the long arm, the sleeve F, having arms I, the springs L M, and the clevis H, substantially as shown and described.

4. The combination, with the arched axle of a cultivator, of the right-angled spring-bar J, with a long and short arm, and pivoted in the long arm above the angle, the adjustable springs L M, clamp-socket K, sleeve F, with arms I and clevis H, and the beam-coupling E G, all substantially as shown and described.

JOSEPH B. NEFF.

Witnesses:
S. S. TUTTLE,
J. A. REMEY.